United States Patent [19]

Judson

[11] Patent Number: 4,998,752
[45] Date of Patent: Mar. 12, 1991

[54] CUSTOMIZED TRIP PLANNER

[76] Inventor: Nancy L. Judson, 30 Park Ave., Suite 50, New York, N.Y. 10016

[21] Appl. No.: 464,705

[22] Filed: Jan. 12, 1990

Related U.S. Application Data

[63] Continuation of Ser. No. 240,685, Sep. 6, 1988, abandoned.

[51] Int. Cl.$^5$ .................. G09B 29/00; G09B 29/10; G09B 29/12; B02F 21/00
[52] U.S. Cl. ..................................... 283/34; 283/37; 434/150; 434/152
[58] Field of Search .................. 283/34, 37, 39; 434/130, 150, 151, 152, 153, 284

[56] References Cited

U.S. PATENT DOCUMENTS

| | | | |
|---|---|---|---|
| 2,316,786 | 4/1943 | Gottlieb | 434/150 |
| 2,352,413 | 6/1944 | Schuch et al. | 434/150 |
| 2,539,286 | 1/1951 | Thompson | 283/34 |
| 2,889,638 | 6/1959 | Anderson | 283/34 |
| 3,487,133 | 10/1969 | Lindsay | 434/152 |
| 3,849,913 | 11/1974 | Williams | 434/150 |
| 4,673,197 | 6/1987 | Shtidelman et al. | 434/150 |

Primary Examiner—Douglas D. Watts
Assistant Examiner—Paul M. Heyrana Sr.

[57] ABSTRACT

A trip planner, comprised of a base map and a plurality of transparent sheets having annotated outlines of the base map, which can be customized to an individual's travel interests and which allow a traveler to plan his trip at a glance.

6 Claims, 5 Drawing Sheets

4,998,752

CUSTOMIZED TRIP PLANNER

This is a continuation of copending application Ser. No. 07/240,685 filed on 9/6/88 abandoned 2/27/90.

BACKGROUND AND SUMMARY OF THE INVENTION

This invention relates generally to trip planning and more specifically to a customized trip planner which will allow a traveler to plan his trip, based on his interests and desires, at a glance. Transparencies pinpointing particular interests in a country, state or region are over laid on a base map of the country, state or region. By viewing the map and transparencies in conjunction, a traveler can determine where in the country, state or region his interests are located. By using an over laying of transparencies, the travel information is not in a fixed medium. Consequently, the interests that can be incorporated are limitless. A traveler can continually add to his basic map with both general and obscure interests.

There is currently nothing in the travel market aimed at enabling a traveler to plan out a personalized trip. The closest product is a travel book. However, a traveler cannot easily personalize a trip by using a travel book. Mass market travel books are generally arranged by location, not subject. A traveler who wants to plan a trip around a particular interest or interests has difficulty. He has to comb the index to find information on his interest(s), which may or may not even be mentioned. For example, if a traveler wants to plan a trip to England and is interested in seeing (1) churches and (2) sites frequented by Thomas Hardy, he first has to use a travel book index and then use a map to pinpoint their locations. Not only is this process tedious, but it is not likely that sites frequented by Thomas Hardy would even be mentioned.

Because most mass market travel books contain neither in-depth subject information, nor obscure topics, a traveler has to buy special interest books to get information on specific subjects. However, the specialized travel books tend to describe only one subject, i.e. "pubs in England". Thus a traveler would have to buy several special interest books to accomodate more than one interest he has when planning a trip.

Additionally, because travel books are in a fixed medium, they cannot be expanded to cover new or more specific travel topics. A traveler just has to buy more books.

Travel books currently on the market also provide few maps. A traveler has to buy an extra map and pinpoint locations described in his travel book on his extra map. This process makes planning a trip difficult. Although road atlases provide maps, there is no information for a traveler. Even the tourist information maps that are specifically designed for travelers point out only the major tourist attractions.

OBJECTS OF THE INVENTION

Accordingly, it is an object of this invention to create a customized trip planner that will allow a traveler to plan his trip, based on his interests.

It is a further object of this invention to produce a customized trip planner that is so easy to use that a traveler can plan his trip at a glance.

It is a further object of this invention to create a customized trip planner whose travel information is not in a fixed medium. Consequently, a traveler can constantly add new information to the planner.

It is a further object of this invention to eliminate the need for "special interest" travel books.

Still other objects and advantages will become readily apparent from the following description, drawings and claims.

DETAILED DESCRIPTION OF THE INVENTION

In accordance with the present invention there is provided a novel trip planner which allows a traveler to (1) totally customize his trip based on any interest and (2) plan his trip at a glance. Accordingly, the mechanics of the invention to accomplish this are as follows: Transparencies of a particular interest would be created by printing an outline of a country, state or region on a flexible transparent sheet such as mylar with numbered indications of the location of these interests.

A base map of the country, state or region would be created on regular paper or cardboard. This map would be topographical, and show major cities and roads. The outline would be the exact size of the outline on the transparency thus allowing the map and transparency to be used in conjunction.

The transparency would be placed over the base map so that a traveler could see where in the country, state or region his interest is located. The smooth quality of the transparency enables the user to easily slide the transparency onto the map. The transparency is then held in place by the attraction of static electricity.

The planner is not limited to one interest. If a traveler had other interests he could layer several transparencies over the map.

An information sheet would be provided with each subject transparency to give the traveler information on each numbered site within.

This invention has many practical advantages. First, it allows a traveler to customize his trip. No matter what the interest, a transparency could be available on any subject for any country, state or region. A further advantage is that the transparencies are not fixed within the planner. Thus, a traveler can constantly add transparencies so that he can incorporate any interest, no matter how obscure. For example, if an individual was interested in going skiing in in New Zealand there would be a transparency to place over his base map to point out the best skiiing areas in New Zealand. If his interest was more obscure, such as going jetboating in New Zealand, another transparency could pinpoint places for this interest and also be placed over the map.

This invention makes trip planning possible at a glance. For example, if a traveler was interested in going skiing and going fishing in New Zealand, he could take his skiing transparency and lay it over the base map. He could then take his fishing transparency and lay it over the skiing transparency. By doing this he can see all the areas of New Zealand that have these two activities in proximity to each other.

Eventually, the limitless subjects of transparencies could eliminate the need for a traveler to buy special interest travel books. He could get locational information on both general and specific subjects merely by over laying transparencies on the basic map. The information sheets would provide all relevant information on the sites detailed on the transparencies. The planner would be less expensive and less bulky when traveling.

Furthermore, travelers can bring the map, transparencies and information sheets with them on their trip to show where other interests lie relative to the destination they have chosen.

Figure 1:
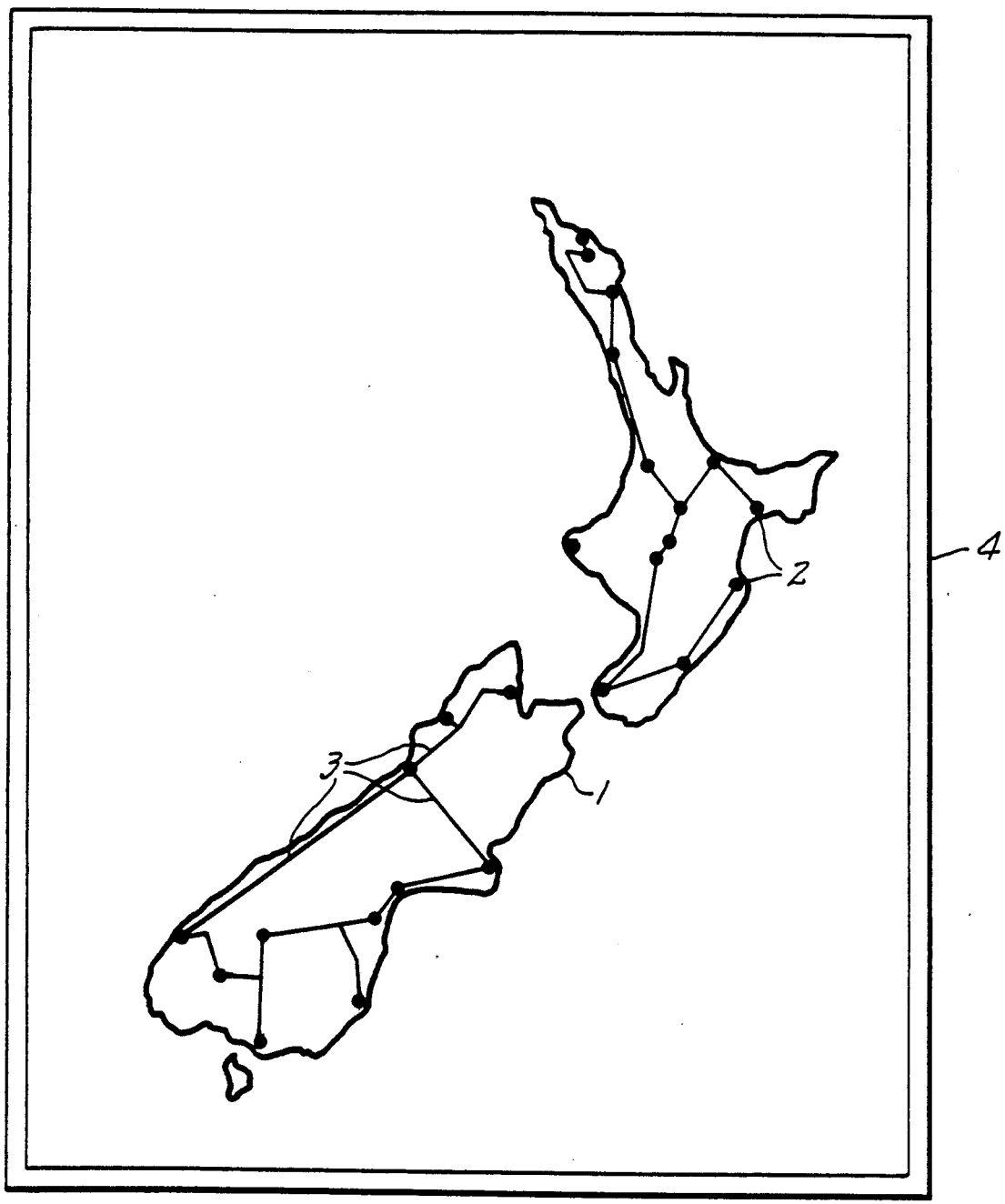
FIG. 1 is a plan view of a base map with the outline of a geographical area showing major cities as dots and routes as lines connecting the dots.

Upon inspection of FIG. 1 it is seen that the base map 4 shows the geographic outline 1 of an area. Dots 2 corresponding to major cities are connected by lines 3 which show the major routes between the cities.

Figure 2:
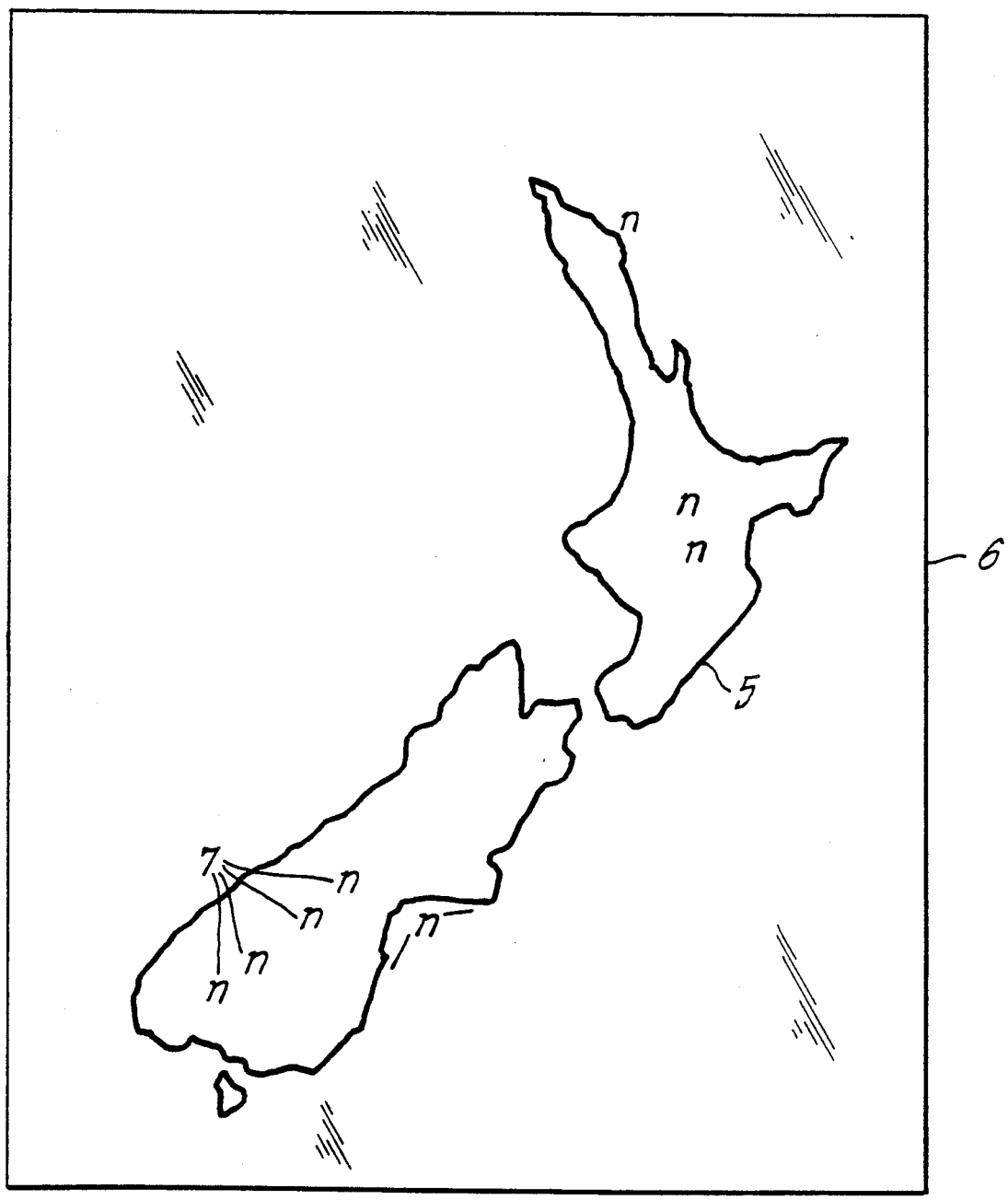
FIG. 2 is a plan view of a transparency showing an outline of the geographical area of FIG. 1 with the locations of unique planning interests shown as numbers.
Figure 3:
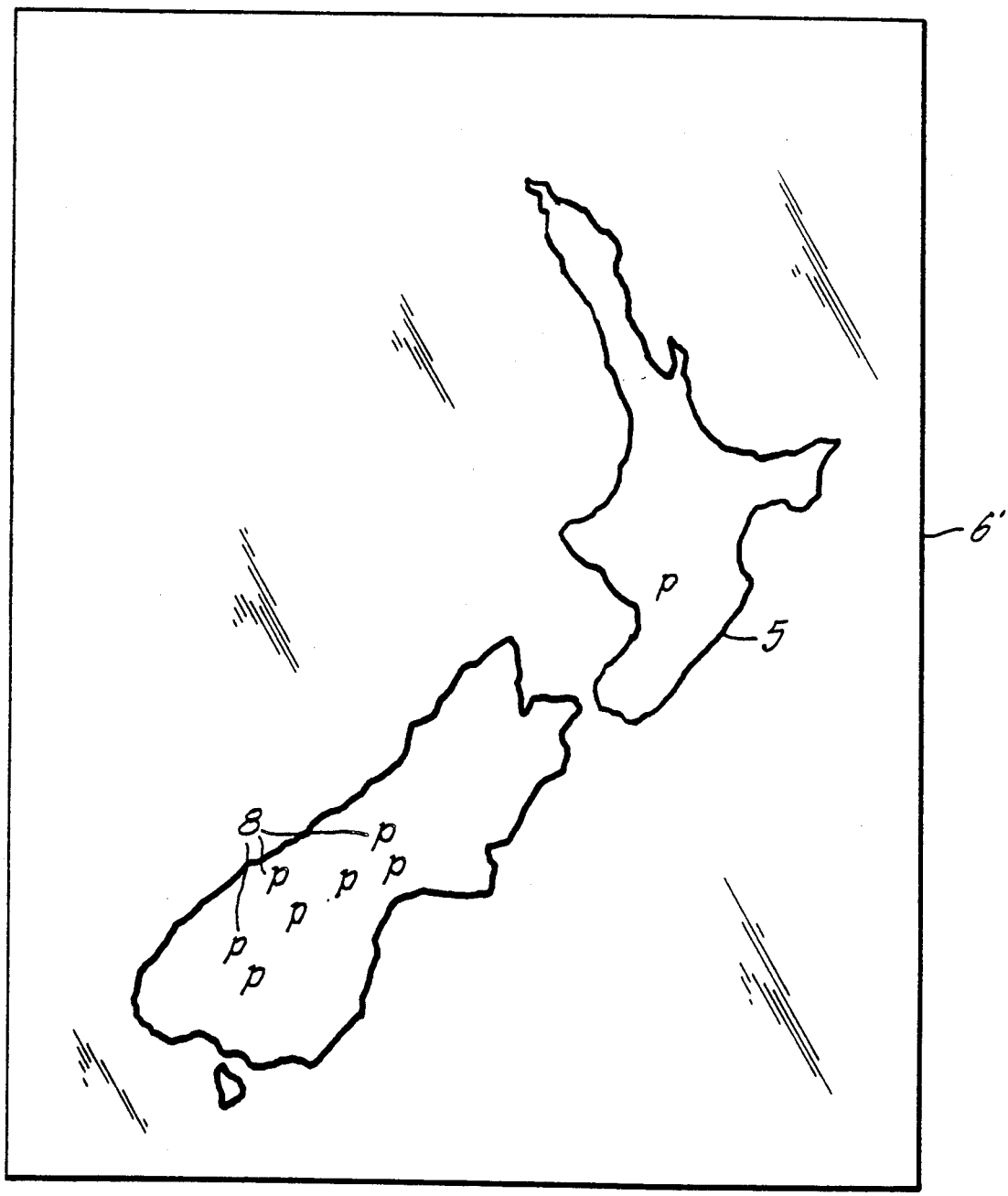
FIG. 3 is a plan view of a transparency showing an outline of the geographical area of FIG. 1 showing the locations of unique planning interests which differ from those shown in FIG. 2.

FIGS. 2 and 3 identify the locations 7 and 8 of unique planning interests which are annotated on the outline 5 of the geographic area of FIG. 1 which is imprinted on transparent sheets 6 and 6'.

Figure 4:
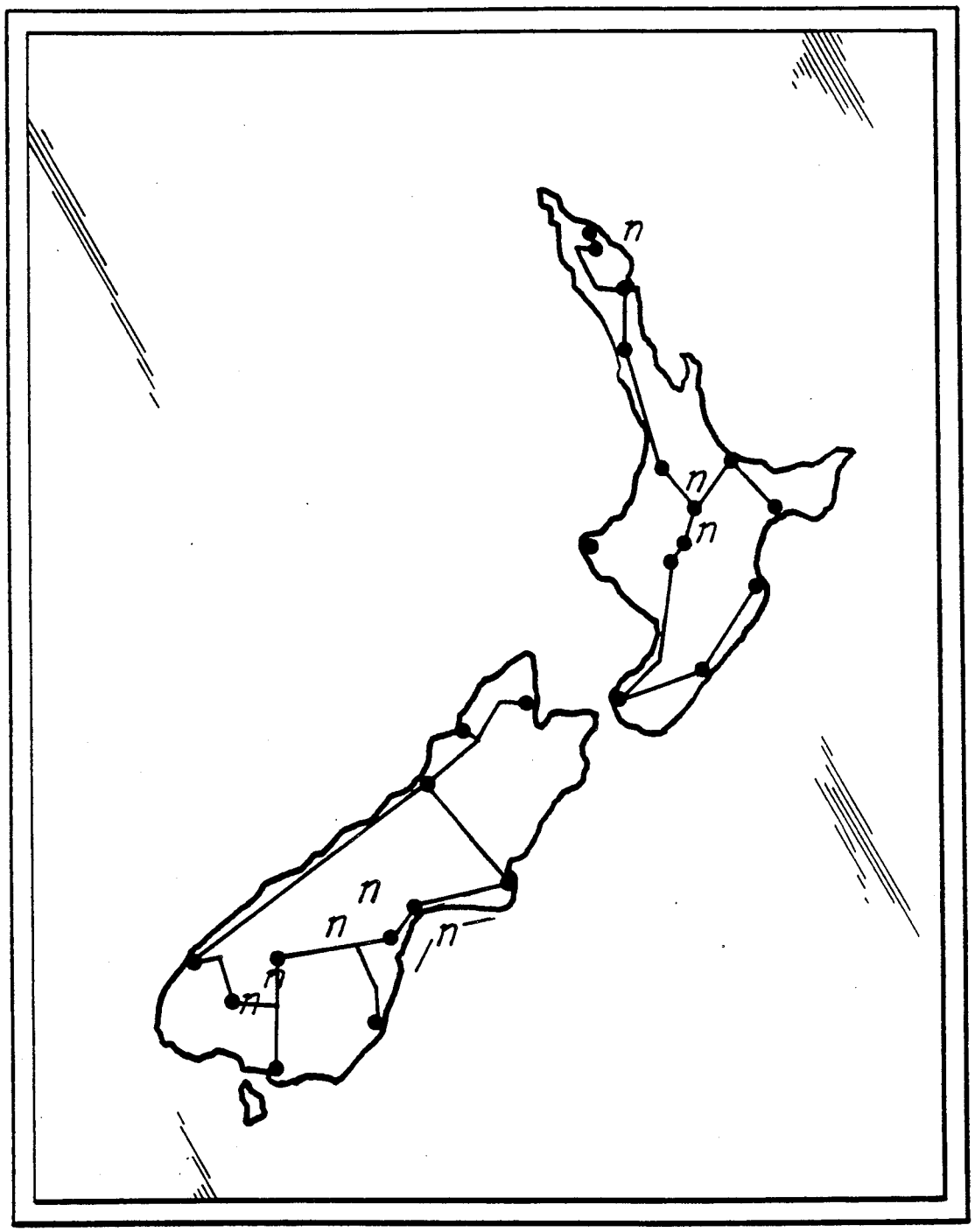
FIG. 4 is a plan view of the FIG. 1 map with the FIG. 2 transparency imposed thereon.
Figure 5:
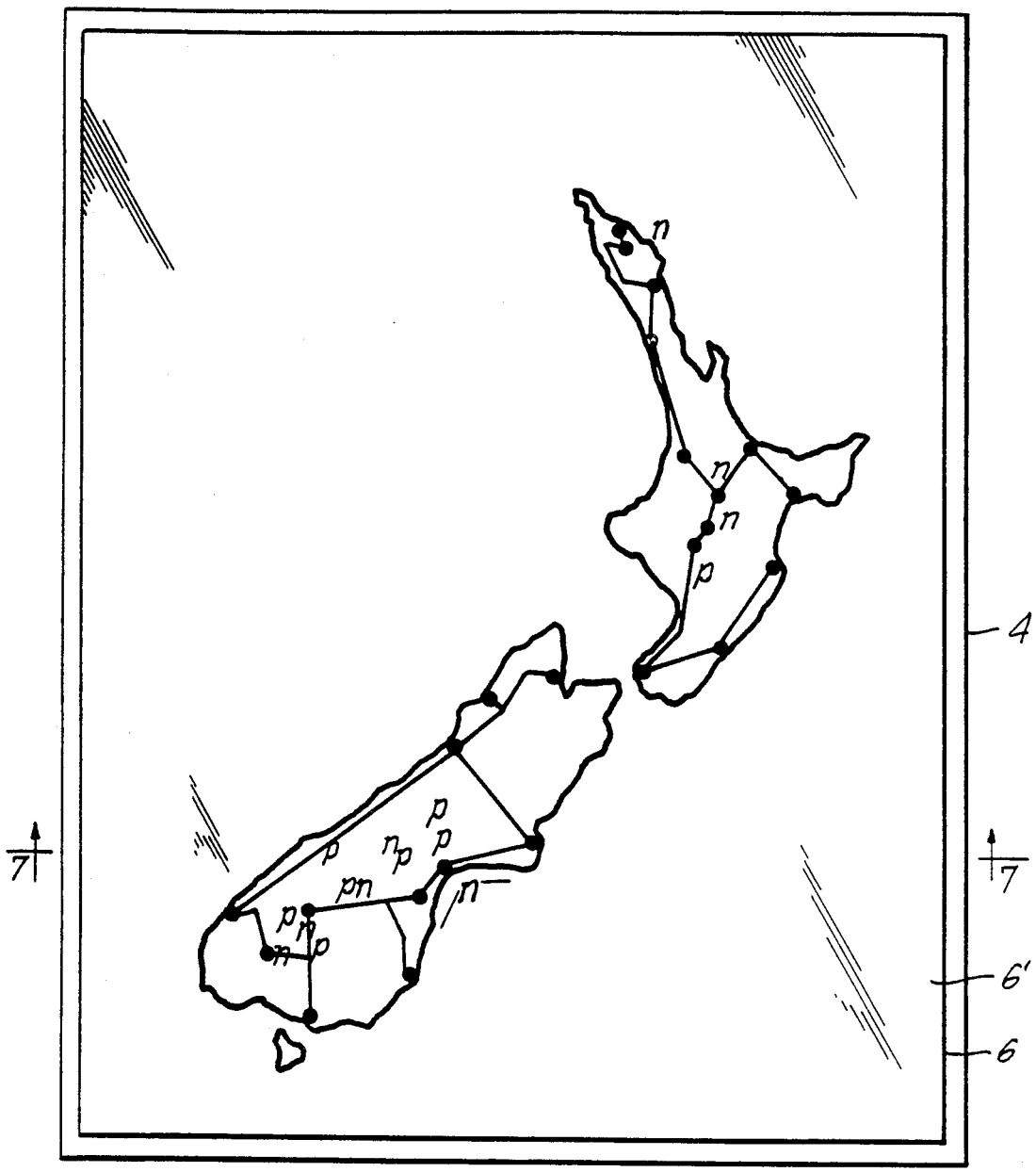
FIG. 5 is a plan view of the FIG. 4 composite with the FIG. 3 transparency imposed thereon.
Figure 6:
FIG. 6 is an enlarged transverse section on the line 6—6 in FIG. 4 looking in the direction of the arrows.
Figure 7:
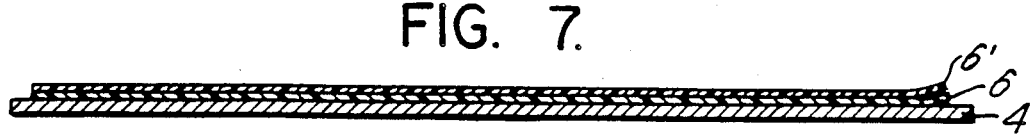
FIG. 7 is an enlarged transverse section on the line 7—7 in FIG. 5 looking in the direction of the arrows.

FIG. 4 shows the view of the FIG. 3 transparent sheet 6 superimposed on the FIG. 1 base map. FIG. 5 shows the further addition of the FIG. 3 transparent sheet 6' on the FIG. 4 composite.

Exemplary FIG. 1, is a base map of New Zealand containing major cities and routes between cities.

Exemplary FIG. 2, is a transparency with numbers pinpointing the best fishing areas in New Zealand.

Exemplary FIG. 3, shows the transparency of the best fishing areas in New Zealand placed over the base map of New Zealand. By using the map and transparency in conjunction, the best fishing areas in New Zealand, and how to get there from any major city, are readily apparent.

Exemplary FIG. 4, shows a transparency of the best skiing areas in New Zealand, laid over the transparency of the best fishing areas in New Zealand. Both transparencies are then laid over the base map. This illustrates that the planner is not limited to one interest. For example, the traveler who wants to go to New Zealand but does not know whether to go to the North or South Island, can over lay transparencies to see which destination has the most of his interests.

The above examples and uses are set forth for illustration only, without in any way limiting the scope of the instant invention.

I claim:

1. A planner which comprises
   (a) a base map having a definitive area outline;
   (b) a plurality of transparent sheets each having an annotated outline of the base map printed thereon wherein each said annotated outline depicts the locations of a travel planning interest;
   (c) each annotated outline being the exact size of the definitive area outline of the base map;
   (d) means for attachment of a plurality of transparent sheets over the base map such that the annotated outlines of the transparent sheets correspond exactly with the definitive area outline of the base map.

2. A planner as claimed in claim 1, wherein the base map is printed in a first color and the annotated outline on the transparent sheet is printed in a second color.

3. A planner as claimed in claim 1 wherein the base map is imprinted with the location of major cities.

4. A planner as claimed in claim 1 wherein the base map is imprinted with major routes between cities.

5. A planner which comprises
   (a) a base map having a definitive area outline printed in first color, said base map imprinted with location of major cities and major routes between major cities;
   (b) a plurality of transparent sheets each having an annotated outline of the base map printed thereon wherein each said annotated outline depicts the location of a travel planning interest and wherein each said annotated outline on the transparent sheet is printed in a second color;
   (c) each said annotated outline being the exact size of the definitive area outline of the base map;
   (d) and means for attachment of a plurality of transparent sheets over the base map such that the annotated outlines of the transparent sheets correspond exactly with the definitive area outline of the base map.

6. A method of trip planning comprising:
   (a) over laying a plurality of transparent sheets on a base map, each transparent sheet having an annotated outline of the base map printed thereon wherein each annotated outline depicts the locations of a separate travel planning interest,
   (b) viewing the base map and the over laid transparent sheets in conjunction, and
   (c) determining the proximities of the locations of the travel planning interests relative to each other for use in trip planning.

* * * * *